United States Patent
Takahashi et al.

(10) Patent No.: US 8,337,932 B2
(45) Date of Patent: Dec. 25, 2012

(54) BUBBLE STABILIZER AND SPARKLING BEVERAGE CONTAINING THE SAME

(75) Inventors: Taro Takahashi, Izumisano (JP); Hitoshi Furuta, Izumisano (JP); Mikiko Nishizawa, Izumisano (JP)

(73) Assignee: Fuji Oil Company, Limited, Osaka (JP)

( * ) Notice: Subject to any disclaimer, the term of this patent is extended or adjusted under 35 U.S.C. 154(b) by 626 days.

(21) Appl. No.: 12/312,778

(22) PCT Filed: Nov. 22, 2007

(86) PCT No.: PCT/JP2007/072637
§ 371 (c)(1),
(2), (4) Date: May 27, 2009

(87) PCT Pub. No.: WO2008/069027
PCT Pub. Date: Jun. 12, 2008

(65) Prior Publication Data
US 2010/0028486 A1    Feb. 4, 2010

(30) Foreign Application Priority Data

Nov. 28, 2006  (JP) .................................. 2006-320143

(51) Int. Cl.
*A23L 1/20*     (2006.01)

(52) U.S. Cl. ........................ 426/634; 426/656; 426/329
(58) Field of Classification Search .................... 426/634
See application file for complete search history.

(56) References Cited

U.S. PATENT DOCUMENTS

| 3,966,976 A | * | 6/1976 | Schuppner et al. | ............ 426/329 |
| 5,710,270 A | * | 1/1998 | Maeda et al. | ................. 536/124 |
| 2005/0220935 A1 | | 10/2005 | Oono | |
| 2007/0178189 A1 | | 8/2007 | Ishii et al. | |

FOREIGN PATENT DOCUMENTS

JP                61-92554              5/1986
(Continued)

OTHER PUBLICATIONS

Shimizu, H. "Manufacture of Water-Soluble Soybean Polysaccharide from Soybean Food By-Product (Okara)" Foods Food Ingredients J. Japan No. 201 (2002)—Summary Only.*
JP 2006314282—Araki et al.; Derwent Abstract Only, Nov. 2006.*
Furuta et al. "Soybean Polysaccharide" in Foods Food Ingredients J. Jpn. vol. 208. No. 10. 2003—Summary Only.*

(Continued)

*Primary Examiner* — Elizabeth Gwartney
(74) *Attorney, Agent, or Firm* — Wenderoth, Lind & Ponack, L.L.P.

(57) ABSTRACT

The object is to improve the bubble retention in a sparkling beverage such as a malt alcoholic beverage including a beer and a sparkling liquor, a sparkling alcoholic beverage produced without any malt and a carbonated refreshing beverage including a soda pop and a cream soda. Disclosed is a bubble stabilizer comprising, as an active ingredient, a water-soluble soybean polysaccharide which is produced by the heat-extraction from a soybean or a processed product of a soybean at a pH lower than the isoelectric point of a soybean protein and ranging from 2.4 to 4.0 at a temperature of 100° C. or higher. The bubble stabilizer can be added to a malt alcoholic beverage such as a beer and a sparkling liquor, a sparkling alcoholic beverage produced without any malt or a carbonated refreshing beverage such as a soda pop and a lemon soda to thereby improve the bubble retention in the beverage.

10 Claims, 2 Drawing Sheets

FOREIGN PATENT DOCUMENTS

| | | |
|---|---|---|
| JP | 5-38275 | 2/1993 |
| JP | 5-244880 | 9/1993 |
| JP | 2006-204172 | 8/2006 |
| JP | 2006-314282 | 11/2006 |
| JP | 2007-181427 | 7/2007 |
| WO | 2004/000990 | 12/2003 |
| WO | 2005/005593 | 1/2005 |

OTHER PUBLICATIONS

Furuta et al. "Extraction of Water-soluble Soybean Polysaccharides under Acidic Conditions" in biosci. Biotechnol. biochem. 62 (12), 2300-2305, 1998.*

International Search Report issued Mar. 4, 2008 in the International (PCT) Application of which the present application is the U.S. National Stage.

* cited by examiner

BUBBLE STABILIZER AND SPARKLING BEVERAGE CONTAINING THE SAME

This application is a U.S. national stage of International Application No. PCT/JP2007/072637 filed Nov. 22, 2007.

TECHNICAL FIELD

The present invention provides a bubble stabilizer improving bubble retention of a sparkling beverage such as a malt alcoholic beverage, a sparkling alcoholic beverage produced without any malt, a carbonated refreshing beverage and the like. The present invention also provides a process for producing a malt alcoholic beverage, and a sparkling alcoholic beverage produced without any malt, which contain the stabilizer and have improved bubble retention.

BACKGROUND ART

Currently, in our country, as alcoholic beverages produced with malt, beers and sparkling liquors are consumed much. Sparkling liquors are produced with a smaller amount of malt as compared with beers and, in accordance with the Liquor Tax Act, beverages produced with malt in an amount of 66.7% by weight or more of total raw materials except for water are classified into beers, and beverages produced with malt in the amount of less than 66.7% by weight are classified into sparkling liquors. Further, recently, subsequent to "beers" or "sparkling liquors", beverages so-called "third beers" are sold on the market. As the "third beers", there are beers produced without any malt as raw materials and beers in which other alcoholic beverages are mixed in beers or sparkling liquors, and they are produced with a smaller amount of malt as compared with beers, similarly. In accordance with the Liquor Tax Act, the former is classified into "other brewed liquors (sparkling) (1)" or "other miscellaneous liquors (2)", and the latter is classified into "liqueurs (sparkling) (1)".

Meanwhile, bubbles of beers have important functions such that beers taste as good as their looks, a carbonic acid gas is suppressed from escaping to the outside, degradation of beers due to contact with the air is prevented to retain a taste, a flavor is generated by foaming, and the like. For these reasons, improvement in bubble retention is an important factor for making beers having better quality. This is not limited to beers, but is also similar to sparkling liquors which are substitute beverages for beers, and the third beers. However, in beer-like beverages in which an amount of malt to be used is suppressed as described above, there is a problem that bubble retention is inferior as compared with beers. This is because a protein and a carbohydrate derived from malt contribute to bubble retention of beers.

In order to solve such a problem, for example, Patent Document 1 discloses a technique of using saponin, a thickener or the like as a bubble retention improving agent in a sparkling liquor, Patent Document 2 discloses a technique of using a pea protein extracted from peas as a bubble retention improving substance in a sparkling alcoholic beverage, and Patent Document 3 discloses the use of a sorghum degradation product in a sparkling liquor. However, all of them have a rough feeling, and have insufficient bubble retention effects.

On the other hand, in carbonated refreshing beverages in which carbonic acid is contained in the beverages such as a soda pop, a cola, and a juice, there is no bubble retention due to a protein. A refreshing feeling due to bubbles is felt, but produced bubbles are rough, the bubble retention is also worse, and stimulation with carbonic acid is too strong and, thus, the beverages are not necessary preferable from the viewpoint of a palate. For this reason, in the carbonated refreshing beverages, a technique of producing fine bubbles, and capable of improving the bubble retention is also demanded.

In order to solve such problem of the carbonated refreshing beverages, Patent Document 4 discloses a process for producing a high sparkling refreshing beverage having such a composition that a raw material solution contains a saponin ingredient and a carbonic acid gas, and Patent Document 5 discloses a process for producing a sparkling luxury beverage having improved foaming and bubble retention, which comprises preparing a luxury beverage by incorporating saponin or a saponin containing preparation, and an oligosaccharide, or an oligosaccharide and a polysaccharide together therein, and carbonating the beverage. However, in these techniques, bitterness due to the saponin ingredient is problematic. The present applicants have previously filed an application directed to a food foaming agent and a foaming stabilizer containing, as an active ingredient, a water-soluble hemicellulose extracted from an oil stuff seed including a soybean (Patent Document 6). However, the agent is aimed at shake beverages such as a milkshake or similar products, and its effect on sparkling beverages in the present invention has still a room for improvement.

Patent Document 1: WO 04/000990
Patent Document 2: WP 05/005593
Patent Document 3: JP 2006-204172 A
Patent Document 4: JP 61-92554 A
Patent Document 5: JP 5-38275 A
Patent Document 6: JP 5-244880 A

DISCLOSURE OF THE INVENTION

Problems to be Solved by the Invention

An object of the present invention is to improve bubble retention of malt alcoholic beverages such as a beer, sparkling alcoholic beverages such as a sparkling liquor containing no malt, and carbonated refreshing beverages such as a soda pop and a soda, and the like.

Means for Solving the Problems

The present inventors have intensively studied to achieve the above object. When the water-soluble soybean polysaccharide which is the active ingredient of the food foaming agent and foaming stabilizer of the previously filed application (Patent Document 6) was added to a beer-like sparkling alcoholic beverage produced without any malt, and stability of bubbles was examined, the stability of bubbles was improved, but was still inferior as compared with a beer. Then, the conditions for producing the water-soluble soybean polysaccharide and the bubble retention effect of a sparkling beverage were further studied in detail. As a result, it has been found that a water-soluble soybean polysaccharide extracted under certain specific extraction conditions can remarkably improve the stability of bubbles of the beer-like beverage. The extracting conditions are such that an extraction pH is a pH of 2.4 to 4.0, and an extraction temperature is 100° C. or higher in a process for producing a water-soluble soybean polysaccharide described hereinafter. In addition, it has been found that the water-soluble soybean polysaccharide is excellent in the bubble retention improving effect also in a carbonated refreshing beverage such as a soda pop and a lemon soda, and the effect of suppressing stimulation of carbonic acid is also obtained.

That is, the present invention provides:

(1) A bubble stabilizer for a sparkling beverage comprising, as an active ingredient, a water-soluble soybean polysaccharide which is produced by heat-extraction from a soybean or a processed product of a soybean at a pH of 2.4 to 4.0 and at an extraction temperature of 100° C. or higher;

(2) A sparkling beverage comprising the bubble stabilizer according to the above (1), (3) The sparkling beverage according to the above (2), which is an alcohol-containing beverage;

(4) In a process for producing a sparkling alcoholic beverage comprising preparing a pre-fermentation solution containing a carbon source, a nitrogen source, hop and water without any barley, wheat and malt, and fermenting the pre-fermentation solution with yeast, said process is characterized by using the water-soluble soybean polysaccharide according to the above (1) as a part of raw materials; and (5) In a process for producing a malt alcoholic beverage comprising steps of: a mashing step wherein raw materials containing malt is saccharified to collect wort, a fermentation step wherein wort is fermented with yeast, a storing step wherein a fermentation-completed solution is stored, and a filtration and filling step wherein a storage-completed solution is filtered and filled in a container, said process is characterized by adding the water-soluble soybean polysaccharide according to the above (1) in any of the above production steps.

Effect of the Invention

According to the present invention, the bubble retention of malt alcoholic beverages such as a beer and a sparkling liquor, sparkling alcoholic beverages produced without any malt, and carbonated refreshing beverages such as a soda pop and a lemon soda can be improved. By the bubble stabilizer for a sparkling beverage of the present invention, such a secondary effect as fine bubbles of a beverage can be obtained. In the carbonated refreshing beverage, stimulation of carbonic acid is suppressed, and the beverage becomes pleasant to drink.

BEST MODE FOR CARRYING OUT THE INVENTION

The water-soluble soybean polysaccharide of the present invention is obtained from a soybean or a processed product of a soybean by heat-extraction at a pH lower than the isoelectric point of a soybean protein, preferably at an acidic pH of 2.4 to 4.0, further preferably 3.0 to 3.5, and at a temperature of over 100° C.

As a soybean raw material used in the present invention, a cotyledon part of soybeans is preferable, and a so-called "okara (soy pulp)" which is produced as a byproduct during production of "tofu (bean curd)" or a soybean protein isolate is more preferable since it contains polysaccharides abundantly. When "okara" of "tofu" is used as a raw material, a low-molecular water-soluble fraction has been removed in advance and, when "okara" produced as a byproduct in the production steps of a soybean protein isolate is used, an oil-soluble component has been further removed and, therefore, this can be advantageously used as a raw material.

In the present invention, first, heat-extraction from these raw materials is carried out. A pH at the heat-extraction is adjusted to a pH lower than the isoelectric point of a soybean protein, preferably a pH of 2.4 to 4.0. Further preferably, a pH is adjusted to 3.0 to 3.5. As an acid used at this time, any acids applicable to the food industry such as hydrochloric acid as well as phosphoric acid, sulfuric acid, lactic acid, citric acid, and oxalic acid can be used without any particular limitation.

It is necessary that the heat-extraction temperature is 100° C. or higher. A temperature of lower than 100° C. is not preferred from the practical viewpoint because, even when pH is adjusted to the above range, the extraction requires long time, a yield is reduced, and the like. An upper limit of the heating temperature is not particularly defined, but when heating is carried out at an extremely high temperature, a side reaction is easily caused, and coloration is easily generated. The heating is carried usually at 180° C. or lower, preferably at 150° C. or lower.

After the heat-extraction, solids and the extract are separated by a conventional method such as filtration, centrifugation, and the like. Then, the extract is, if necessary, subjected to neutralization and/or desalting, and to purification treatment of removing hydrophobic substances or low-molecular substances. Examples of the method of purification treatment include active carbon treatment or resin adsorption treatment, and a re-precipitation method using a polar solvent such as methanol, ethanol, isopropanol or acetone, a ultrafiltration method, a reverse osmosis method, a gel filtration method, a dialysis method, an ion exchange resin method, an electrodialysis method, an ion exchange membrane method, and the like. These methods can be carried out alone or by combining two or more thereof. Particularly, when a re-precipitation method using a polar solvent, a ultrafiltration method, a reverse osmosis method, a gel filtration method or a dialysis method is used, various low molecular weight substances can also be removed. In case of carrying out desalting purification treatment, the treatment is preferably carried out so that an ash content in the polysaccharides after treatment becomes 15% by weight or less, preferably 5 to 10% by weight.

Further, when the above purification treatment is carried out, demethoxylation treatment by a known method (Patent Document, JP 5-262802 A), such as heat treatment in an alkaline region before or after the purification treatment can be carried out.

The bubble stabilizer of the present invention contains the water-soluble soybean polysaccharide as an active ingredient, it alone can exert the sufficient effect, but an emulsifier such as monoglyceride, and various substances having other bubble stabilizing effect can also be used in combination.

The sparkling beverage in the present invention includes:

(1) malt alcoholic beverages (beer, sparkling liquor, beverage in which another alcoholic beverage is mixed with beer or sparkling liquor, non-alcohol beer etc.), (2) sparkling alcoholic beverages produced without any malt (beer-like beverages produced without any malt classified as "other brewed liquors (sparkling) (1)", liqueurs such as highball of "Shochu" so-called "Shochu with tonic water"), (3) carbonated refreshing beverages containing no protein component contributing to bubble stability (soda pop, lemon soda, nutrient beverage etc.).

In addition, beverages which are not usually sparkling such as tea, black tea, coffee, liqueur, wine, "Shochu", spirits and whisky, when they are carbonated, whereby sparkling property is imparted, are also included. The carbonated beverages such as a soda pop and a cream soda includes powdery instant type carbonated beverages which are used for drinking by dissolving them in water or hot water, and the sparkling beverage in the present invention broadly include such beverages.

A content of the bubble stabilizer of the present invention in a beverage is 0.01 to 5% by weight, preferably 0.02 to 2% by weight as the water-soluble soybean polysaccharide. Even when the stabilizer is added at an amount exceeding this, no difference is seen in the effect. On the other hand, when the content is too small, the effect becomes insufficient. When processed into a powder beverage, the content can also be in the above range in the state where the powder beverage is dissolved in water so as to be a suitable concentration.

In the process for producing the sparkling beverage of the present invention, a conventional known processes can be used without any particular limitation regardless of a method and timing for adding the bubble stabilizer of the present invention. Even in the sparkling alcoholic beverage produced without any malt, and the malt alcoholic beverage, the bubble stabilizer in the present invention can be added at an arbitrary stage in conventional known production steps. For example, the sparkling alcoholic beverage produced without any malt is produced by producing a pre-fermentation solution containing a carbon source, a nitrogen source, hop and water, and fermenting the pre-fermentation solution with yeast and, by using the water-soluble soybean polysaccharide of the present invention as a part of raw materials, bubble retention thereof is improved.

In addition, a step for producing a general malt alcoholic beverage includes a mashing step of stirring and mixing raw materials containing malt and brewing water, warming the mixture to be saccharified, and collecting wort, a fermentation step of adding yeast, followed by fermentation, an alcohol preservation step of preserving the fermentation-completed solution, and a filtration and filling step of filtering the alcohol preservation-completed solution, and filling the solution into a container, and the water-soluble soybean polysaccharide of the present invention can be added at any stage of these production steps.

Production Example

To the raw "okara" obtained in a step of producing a soybean protein isolate was added a 2-fold amount of water, a pH was adjusted to 3.5 with hydrochloric acid, and the mixture was heat-extracted at 120° C. for 1.5 hours. A pH of the heat-extracted slurry after cooling was 3.57. After a pH of the recovered slurry was adjusted to 5.0, it was subjected to centrifugation (10000G×30 minutes) to separate into a supernatant liquid and a precipitate part. The thus separated precipitate was further washed with an equivalent weight of water, and this was subjected to centrifugation. The supernatant liquid was combined with the previous supernatant liquid, and the mixture was subjected to desalting treatment by electrodialysis and, thereafter, drying the mixture to obtain a water-soluble soybean polysaccharide (A).

Comparative Production Example

To raw "okara" obtained in a step of producing a soybean protein isolate was added a 2-fold amount of water, a pH was adjusted to 4.5 with hydrochloric acid, and the mixture was heat-treated at 120° C. for 1.5 hours. A pH of the heat-extracted slurry after cooling was 4.61. After a pH of the recovered slurry was adjusted to 5.0, it was subjected to centrifugation (10000G×30 minutes) to separate into a supernatant liquid and a precipitated part. The thus separated precipitate part was washed with an equivalent weight of water, and this was subjected to centrifugation. The supernatant liquid was combined with the previous supernatant liquid, and the mixture was subjected to desalting treatment by electrodialysis and, thereafter, drying the mixture to obtain a water-soluble soybean polysaccharide (B).

Example 1

To 100 ml of a degassed commercially available beer-like beverage classified into "other brewed liquors (sparkling) (1)" was added a 20% aqueous solution of the water-soluble soybean polysaccharide (A) obtained in Production Example so as to be 10 to 200 mg as the water-soluble soybean polysaccharide, 50 ml of the mixture was dispensed into a 100 ml of measuring cylinder, it was vigorously shaken up and down for 1 minute and allowed to stand, and the stability of bubbles was assessed using the height of bubbles after 15 minutes as an index. As comparison, a commercially available beer was assessed by the same method, without adding the water-soluble soybean polysaccharide. In the beverage in which the water-soluble soybean polysaccharide was added, the stability of bubbles was remarkably improved in proportion to increase in an addition amount, as compared with the beverage in which no polysaccharide was added (FIG. 1). In addition, in the beverage containing the water-soluble soybean polysaccharide, bubbles were fine, and the beverage went down smoothly, being preferable.

Example 2

To 100 ml of a commercially available beer-like beverage produced without any molt classified into "other brewed liquors (sparkling) (1)" was added a 20% aqueous solution of the water-soluble soybean polysaccharide (A) so as to be 50 mg as the water-soluble soybean polysaccharide, and the mixture was calmly stirred. This was poured into a glass, and allowed to stand for 2 minutes, and observation of the bubble state, and sensory assessment were performed. As comparison, a beverage with nothing added thereto was assessed under the same condition. In the beverage with nothing added thereto, bubbles almost disappeared after 2 minutes, but in the beverage with the water-soluble soybean polysaccharide (A) added thereto, the bubbles sufficiently remained, covering a liquid surface, and the bubbles were fine. In addition, in the beverage with the water-soluble soybean polysaccharide (A) added thereto, a mellow flavor, and an aroma of a beer were felt even after 2 minutes, being preferable.

Experimental Example 1

The stability of bubbles was assessed with time using the water-soluble soybean polysaccharide A obtained in Production Example, and the water-soluble soybean polysaccharide B obtained in Comparative Production Example. To 100 ml of a degassed commercially available beer-like beverage classified into "other brewed liquors (sparkling) (1)" was added a 20% aqueous solution of each water-soluble polysaccharide so as to be 50 mg as the water-soluble soybean polysaccharide, 50 ml of the mixture was dispensed into a 100 ml of measuring cylinder, it was vigorously shaken up and down for 1 minute and allowed to stand, and the stability of bubbles was assessed using the height of bubbles after 5 minutes, 10 minutes, and 15 minutes as an index. After allowing to stand for 10 minutes, bubbles in the case of no addition almost disappeared and, after 15 minutes, also in the beverage containing the water-soluble soybean polysaccharide B, bubbles almost disappeared. On the other hand, in the beverage containing the water-soluble soybean polysaccharide A, after allowing to stand for 15 minutes, bubbles almost remained, and it was shown that the stability effect of bubbles of a foaming beverage is remarkably excellent (FIG. 2).

Experimental Example 2

The stability of foaming was compared and assessed with time using the water-soluble soybean polysaccharide A obtained in Production Example and gum arabic (gum Arabic SD, San-Ei Gen F.F.I. Inc.). The experimental method, and the condition were the same as those in Example 2. Bubbles after allowing to stand for 5 minutes almost disappeared, such that the beverage with gum arabic added thereto was not different from the beverage with no gum arabic added thereto. On the other hand, in the beverage containing the water-soluble soybean polysaccharide A, bubbles after 15 minutes almost remained, and the good stability effect was shown (FIG. 3). In addition, in the beverage containing a water-soluble soybean polysaccharide, bubbles were fine, and the beverage went down smoothly, being preferable.

Example 3

(Non-Alcoholic Carbonated Refreshing Beverage)

Into a cup was calmly poured 100 g of carbonated water so as not to make bubbles, to this was added 0.25 ml of a 20% aqueous solution of the water-soluble soybean polysaccharide A obtained in Production Example 1 (50 mg as the water-soluble soybean polysaccharide), and this was calmly mixed. As comparison, a beverage in which 0.25 ml of water was added to 100 g of carbonated water, was prepared. In the beverage with no water-soluble soybean polysaccharide added thereto, bubbles were burst on a surface, and stimulation of carbonic acid was strongly felt in throat. On the other hand, in the beverage with the water-soluble soybean polysaccharide added thereto, not cracking bubbles covered the surface thinly, stimulation of carbonic acid was suppressed, and the beverage was felt mellow.

Figure 1:
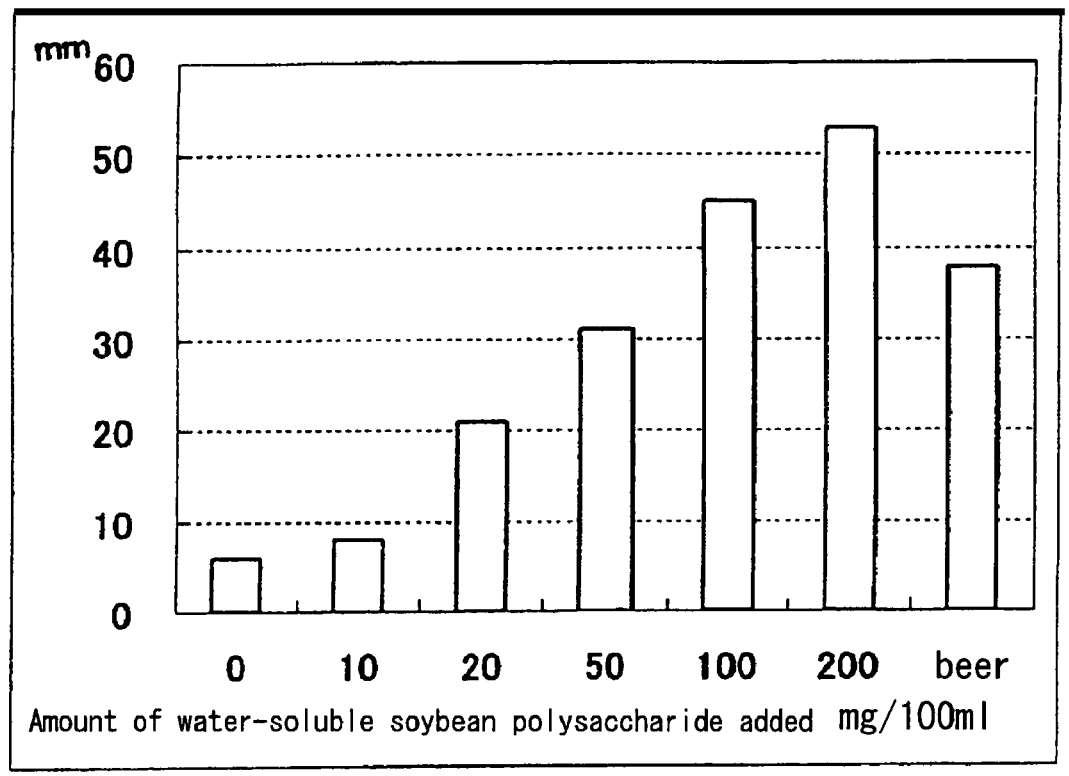
FIG. 1 shows the relation between an amount of the water-soluble soybean polysaccharide added and a bubble retention effect.
Figure 2:
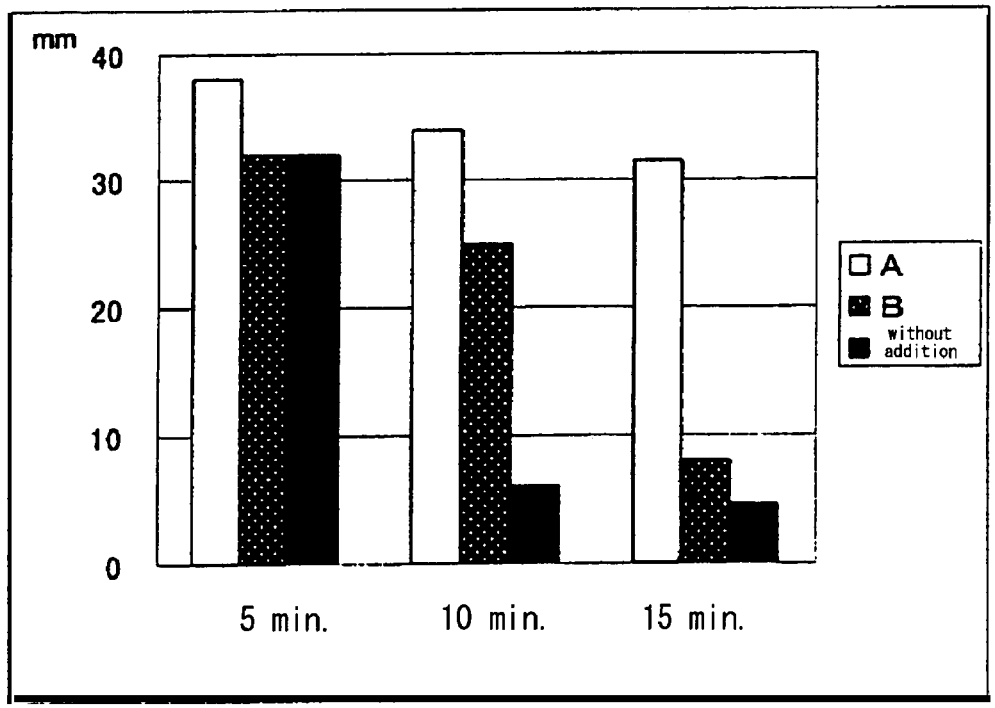
FIG. 2 shows change in the bubble retention effect with time.
Figure 3:
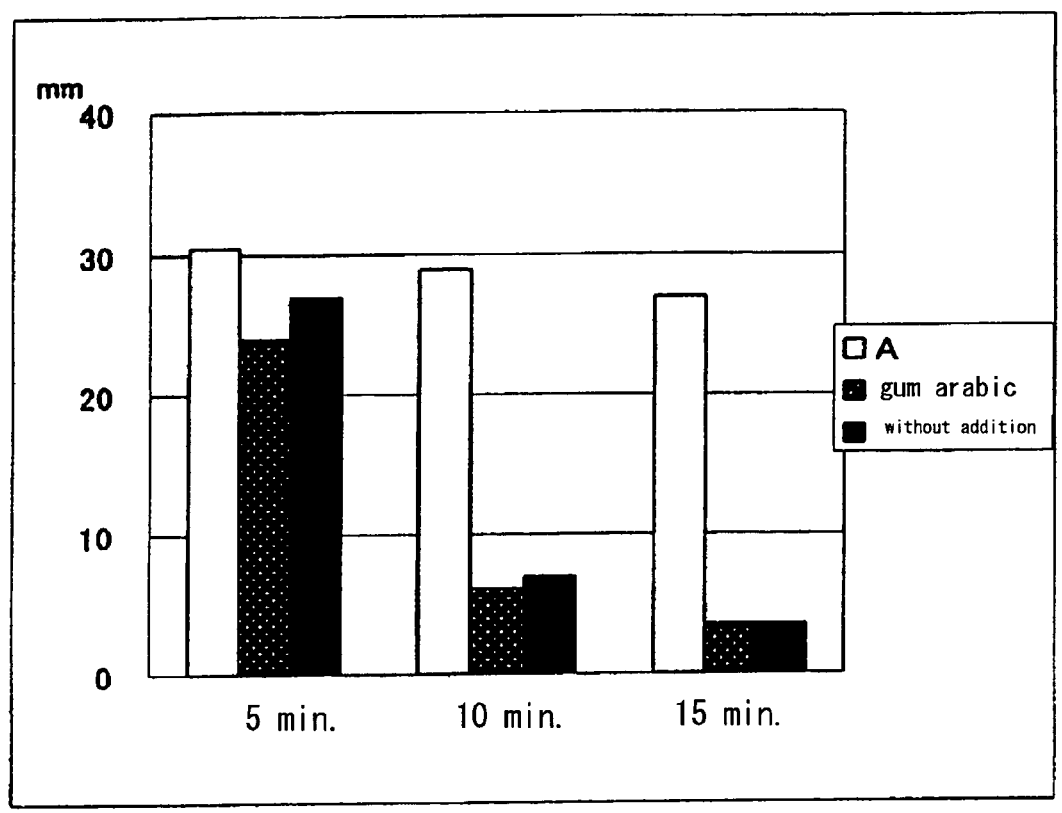
FIG. 3 shows comparison of the bubble retention effect with another polysaccharide.

The invention claimed is:

1. A sparkling beverage comprising a water-soluble soybean polysaccharide obtained by heat-extraction from a soybean or a processed product of a soybean at a pH of 2.4 to 4.0 and at an extraction temperature of 100° C. or higher, wherein the sparkling beverage has improved bubble retention as compared with a sparkling beverage which does not contain the water-soluble soybean polysaccharide.

2. The sparkling beverage according to claim 1, which is an alcohol-containing beverage.

3. The sparkling beverage according to claim 1, wherein an amount of the water-soluble soybean polysaccharide is 0.01 to 5 wt %.

4. The sparkling beverage according to claim 3, wherein the pH is 3.0 to 3.5.

5. The sparkling beverage according to claim 4, which is a malt alcoholic beverage.

6. The sparkling beverage according to claim 4, which is a sparkling alcoholic beverage which is produced without any malt.

7. The sparkling beverage according to claim 4, which is a carbonated refreshing beverage containing no protein component contributing to bubble stability.

8. The sparkling beverage according to claim 5, wherein the sparkling beverage has improved bubble retention as compared with a commercially available malt alcoholic beverage.

9. The sparkling beverage according to claim 6, wherein the sparkling beverage has improved bubble retention as compared with a commercially available sparkling alcoholic beverage which is produced without any malt.

10. The sparkling beverage according to claim 7, wherein the sparkling beverage has improved bubble retention and suppressed stimulation as compared with the sparkling beverage before adding the water-soluble soybean polysaccharide.

* * * * *